United States Patent [19]

Klingler et al.

[11] Patent Number: 4,563,823
[45] Date of Patent: Jan. 14, 1986

[54] MEASURING HEAD OF A MULTI-CORD MEASURING MACHINE

[75] Inventors: Otto Klingler, Oberndorf; Kurt Linder, Karlsruhe, both of Fed. Rep. of Germany

[73] Assignee: Mauser-Werke Oberndorf GmbH, Fed. Rep. of Germany

[21] Appl. No.: 634,124

[22] Filed: Jul. 25, 1984

[30] Foreign Application Priority Data

Aug. 6, 1983 [DE]  Fed. Rep. of Germany ... 8322759[U]

[51] Int. Cl.$^4$ .............................................. G01B 7/02
[52] U.S. Cl. .................................. 33/558; 33/169 R; 33/172 E
[58] Field of Search ............ 33/169 R, 172 E, 174 L, 33/23 K, 558, 559, 561, 556, 503, 504

[56] References Cited

U.S. PATENT DOCUMENTS

| | | | |
|---|---|---|---|
| 3,869,799 | 3/1975 | Never et al. | 33/169 R X |
| 3,945,124 | 3/1976 | Jacoby et al. | 33/174 L X |
| 4,084,323 | 4/1978 | McMurtry | 33/1 M X |

*Primary Examiner*—Harry N. Haroian
*Attorney, Agent, or Firm*—McGlew and Tuttle

[57] ABSTRACT

In a multi-coordinate measuring machine, a contact pin is movable relative to an upper part of a measuring head, in the X, Y and Z directions. The contact pin must be mounted so as to be displaceable from its zero position, and blockable in position in each of these directions. To simplify the construction, the mechanism for displacing and blocking the movements of the pin are combined in the form of an electrodynamic transducer for each of the three directions. The transducer is formed of a pair of aligned coils which are each associated with a permanent magnet.

7 Claims, 3 Drawing Figures

MEASURING HEAD OF A MULTI-CORD MEASURING MACHINE

The present invention relates, in general, to multi-coordinate measuring machines and, in particular, to a new and useful measuring head which utilizes electrodynamic transducers which can both drive a carrier in an appropriate orthogonal direction and also stop the carrier in that direction.

A measuring head is disclosed in German patent No. 22 42 355 which provides three solenoid drives by means of which three respective carriers can be displaced in the X,Y and Z directions of measurement. Definite measuring contact forces can be produced by correspondingly controlling the current of the solenoids. The movements of the solenoid drives must be transmitted to the respective carrier through linkages. This is expensive.

The stopping mechanisms provided in this German patent are associated with the carriers and separated from the solenoid drives. They comprise mechanical arresting elements and are controlled by electrical motors of their own. This again is expensive. In addition, a special electrical control must be provided to coordinate the switching of the stopping mechanisms and the solenoid drives, to block, by means of the stopping mechanism, the contact pin to the effect that if a measuring takes place in one direction, the displacement of the contact pin in the other two directions is blocked by the respective two other stopping mechanisms.

SUMMARY OF THE INVENTION

The present invention is directed to a measuring head of the above-mentioned kind in which the construction of the stopping mechanisms and the displacing mechanism is improved.

Accordingly, an object of the present invention is to provide a measuring head of a multi-coordinate measuring machine which comprises an upper part that defines a fixed frame of reference, a plurality of carriers connected either directly or indirectly to the upper part each movable in an exclusive orthogonally different direction and an electrodynamic transducer connected to the carriers and upper part, each for driving and stopping effect in a different orthogonal direction, each transducer comprising a pair of coils extending in the appropriate orthogonal direction and a core carrying at least one magnet for each coil, the coils being connected to one of the carriers or upper parts and the core connected to another of the carriers or upper part to produce the driving or stopping effect when current is applied to the two coils.

If the coils carry opposite currents at the same time, the respective carrier becomes fixed in its measuring direction. On the contrary, with coil currents in the same direction, the carrier is displaced in its respective measuring direction. With the current reversed, the displacement takes place in the opposite direction. For example, while measuring in the X direction, the carrier for this measuring direction is displaced to approach the measuring surface. Upon coming into contact with the surface, the carrier is held in applied position under a certain measuring contact force. During this measuring contact, the other two carriers, for the Y and Z directions, are stopped in their positions by means of the associated electrodynamic transducers.

The construction of the inventive stopping and displacing mechanism is simple, since both these features are performed by the electrodynamic transducer which is mounted directly adjacent the respective carrier. No linkage is necessary.

In a preferred embodiment of the invention, the coils are axially aligned with each other and spaced apart from each other through non-magnetic portions. This is a further simplification.

A further object of the invention is to provide a measuring head for a multi-coordinate measuring system which is simple in design, rugged in construction and economical to manufacture.

For an understanding of the principles of the invention, reference is made to the following description of a typical embodiment thereof as illustrated in the accompanying drawing.

DESCRIPTION OF THE PREFERRED EMBODIMENT

Figure 1:
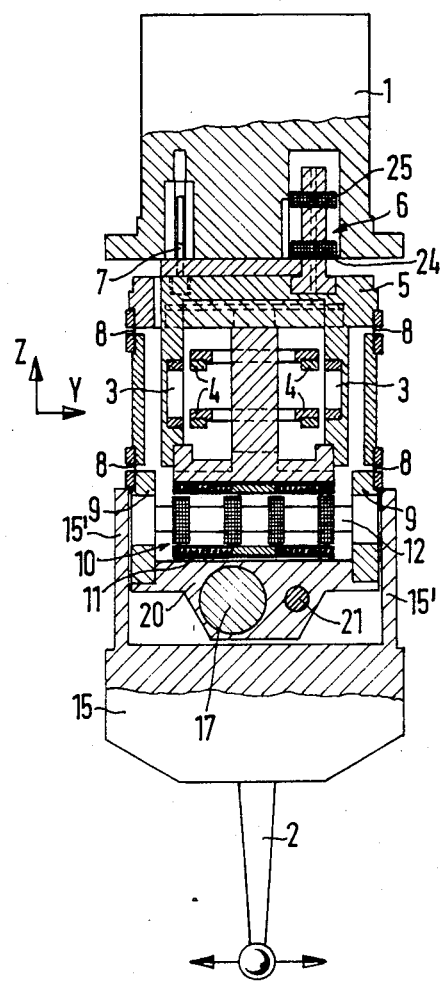
FIG. 1 is a diagrammatical sectional view taken in the Z-Y plane.
Figure 2:
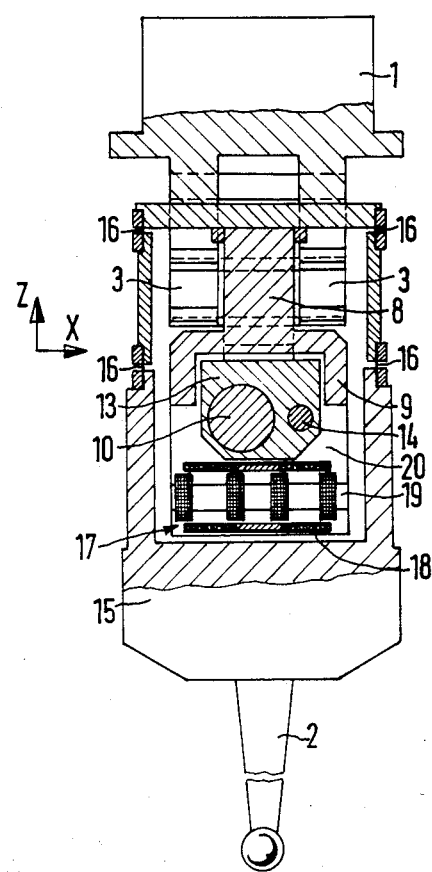
FIG. 2 is a similar view taken in the Z-X plane.

A contact pin 2 is carried, through an intermediate structure, by the upper part 1 of a measuring head of a three-coordinate measuring machine. The upper part defines a fixed frame of reference for the carriers to be described later.

Upper part 1 has two extensions 3 projecting downwardly in the Z direction. Through a parallel-bars suspension 4, extensions 3 support a first carrier 5 which is thus movable relative to upper part 1 in the Z direction. Between first carrier 5 and upper part 1, an electrodynamic transducer 6 is provided by means of which carrier 5 can be either displaced in the Z direction, or fixed in place in the Z direction.

In addition, a Z measuring system 7 is provided between first carrier 5 and supper part 1 for indicating the position of carrier 5 or measuring its position.

A second carrier 9 is suspended from first carrier 5 by means of a springless swing hanger 8 in the form of a parallel-bars suspension, for limited movement to the Y direction. An electrodynamic transducer 10 comprising a coil former 11 and a core 12 and effective in the Y direction is provided between first carrier 5 and second carrier 9. Through a bracket 13, coil former 11 is rigidly connected to first carrier 5. Core 12 is connected to second carrier 9. In addition, a Y measuring system 14 is provided between bracket 13 and second carrier 9.

A third carrier 15 is suspended from first carrier 5 through anchor springless swing hanger 16 forming a third parallel-bars suspension. In the Y direction, second carrier 9 applies against legs 15' of third carrier 15 (see FIG. 1). In the X direction, third carrier 15 is spaced apart from second carrier 9. An electrodynamic transducer 17 comprising a coil former 18 and a core 19 and effective in the X direction is provided between second carrier 9 and third carrier 15. Coil former 18 is secured to an extension 20 of second carrier 9. Core 19 is connected to third carrier 15. An X measuring system 21 is provided between extension 20 and third carrier 15. Contact pin 2 is secured to third carrier 15.

Figure 3:
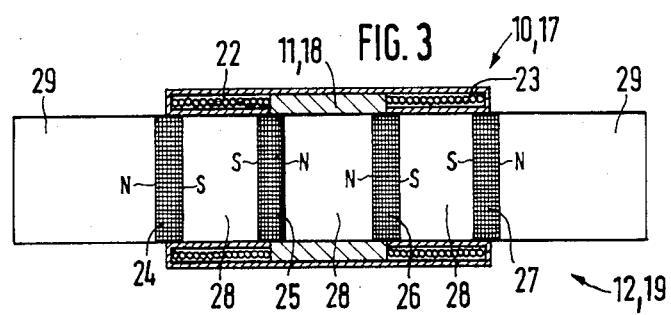
FIG. 3 is a cross-sectional view of an electrodynamic transducer.

Transducers 10 and 17 are constructed as shown in FIG. 3. Coil former 11 or 18 accommodates two spaced-apart coils 22,23. Core 12 or 19 includes four permanent magnets 24,25,26,27. The magnets are provided at the ends of the coils. The north poles N and south poles S of adjacent permanent magnets are provided opposite each other (see FIG. 3). The magnets are secured to each other through non-magnetic connecting portions or members 28. External non-magnetic core portions 29 provide a driving connection to the respective carrier. The coil axes are aligned with each other.

The transducer operates as follows:

If a unidirectional magnetic field is built up by a correspondingly supplied current, core 12 or 19 is moved to the right or left. However, if mutually opposite magnetic fields are built up by the two coils 22,23, core 12 or 19 is blocked in its median position (zero position of the respective measuring system).

Tranducer 6 is substantially of the same design as transducers 10,17. Only, the two coils 22,23 of transducer 6 are not axially aligned, their axes extend parallel to each other. In FIG. 1, only one of these coils is visible.

With the measuring head, the transducers cooperate as follows:

If, for example, a movement in the Y direction is to be made, the current is supplied in the coils of transducer 6 so as to block the movements of first carrier 5 in the Z direction and fix it in its zero position. The coils of transducer 17 are supplied so as to block third carrier 15 in its zero position in the X direction. Then, the coils of transducer 10 are supplied with a current causing a displacement of second carrier 9, and thus also of third carrier 15, through a desired distance in the desired Y direction of movement. At the same time, the desired measuring contact force is thereby produced.

Measurements in the other two directions are effected analogously.

While a specific embodiment of the invention has been shown and described in detail to illustrate the application of the principles of the invention, it will be understood that the invention may be embodied otherwise without departing from such principles.

What is claimed is:

1. A measuring head of a multi-coordinate measuring machine comprising:
   an upper part defining a fixed frame of reference;
   a plurality of carriers each connected to said upper part for movement in a mutually-exclusive orthogonal direction; and
   an electrodynamic transducer connected between two of said carriers and said upper part for driving and stopping movement in each of the mutually exclusive orthogonal directions respectively: each electrodynamic transducer comprising two electrical coils extending in one of the mutually exclusive orthogonal direction and a core movable with respect to said two coils, said core carrying a permanent magnet for each coil, said coil being connected to one of the two carriers and upper part and said core being engageable and fixable with respect to the other of said two carriers and upper part.

2. A measuring head according to claim 1, wherein an axis of each coil in one transducer extends in a straight line.

3. A measuring head according to claim 2, wherein said core has two magnets for each coil, said two magnets having facing common poles with each magnet associated with each coil being at an opposite end of each coil.

4. A measuring head according to claim 1, wherein said core has two magnets for each coil, said two magnets having facing common poles with each magnet associated with each coil being at an opposite end of each coil.

5. A measuring head according to claim 1, wherein said plurality of carriers are connected to each other by parallel-bars springless swing hangers and one of said carriers is connected to said upper part by a parallel-bars springless swing hanger.

6. A measuring head according to claim 1, wherein said plurality of carriers comprises a first carrier, a first parallel-bars bearing mount connected between said first carrier and said upper part for movement in a Z-direction, a second carrier, a second parallel-bars bearing mount connected between said first and second carriers for relative movement in a Y-direction between said first and second carriers, a third carrier and a third parallel-bars bearing mount connected between said third carrier and said first carrier for permitting movement between said first and third carriers in an X-direction, said electrodynamic transducers including a first transducer connected between said upper part and said first carrier for driving and stopping effect in said X-direction, a second transducer connected between said first and second carriers for driving and stopping effect in said Y-direction and a third transducer connected between said second and third carriers for driving and stopping effect in said X-direction.

7. A measuring head according to claim 6, wherein coils of said first transducer are connected to said upper part and a core of said first transducer is connected to said carrier and engageable with said upper part, coils of said second transducer being connected to said first carrier and a core of said second transducer being connected to said second carrier, and coils of said third transducer being connected to said second carrier and a coil of said third transducer being connected to said third carrier.

* * * * *